United States Patent [19]
Chang et al.

[11] Patent Number: 5,745,747
[45] Date of Patent: Apr. 28, 1998

[54] METHOD AND SYSTEM OF LOCK REQUEST MANAGEMENT IN A DATA PROCESSING SYSTEM HAVING MULTIPLE PROCESSES PER TRANSACTION

[75] Inventors: Amy Chang, Cortlandt Manor; Hui-I Hsiao, Yorktown Heights, both of N.Y.

[73] Assignee: International Business Machines Corporation, Armonk, N.Y.

[21] Appl. No.: 769,845

[22] Filed: Dec. 20, 1996

Related U.S. Application Data

[63] Continuation of Ser. No. 384,503, Feb. 6, 1995, abandoned.
[51] Int. Cl.$^6$ .................................................. G06F 17/30
[52] U.S. Cl. .................................. 395/608; 395/726
[58] Field of Search .................................. 395/600, 650, 395/608, 672, 674, 676, 726; 364/DIG. 1, DIG. 2

[56] References Cited

U.S. PATENT DOCUMENTS

| | | | |
|---|---|---|---|
| 4,716,528 | 12/1987 | Crus et al. | 395/650 |
| 4,897,782 | 1/1990 | Bennett et al. | 395/600 |
| 5,062,038 | 10/1991 | Jordan, Jr. | 395/650 |
| 5,063,501 | 11/1991 | Jordan, Jr. | 395/725 |
| 5,063,504 | 11/1991 | Jordan, Jr. | 395/725 |
| 5,117,352 | 5/1992 | Falek | 395/575 |
| 5,161,227 | 11/1992 | Dias et al. | 395/650 |
| 5,247,672 | 9/1993 | Mohan | 395/650 |
| 5,355,477 | 10/1994 | Strickland et al. | 395/600 |
| 5,414,839 | 5/1995 | Joshi | 395/600 |
| 5,485,607 | 1/1996 | Lomet et al. | 395/600 |

*Primary Examiner*—Thomas G. Black
*Assistant Examiner*—M. N. Von Buhr
*Attorney, Agent, or Firm*—Raymond M. Galasso; Jenkins & Gilchrist; Richard M. Ludwin

[57] ABSTRACT

A data processing system and method which manages lock requests at both the transaction and process levels. A lock manager allocates one lock request block (LRB) per process and identifies the ownership of the lock by storing process, transaction and shared IDs in the LRB. The process ID is used to identify which lock to release when a process wants to release the lock before transaction commit while the transaction ID is used to identify all locks to be released at the commit/roll back time of the transaction. The shared ID is a unique value which identifies the lock. The LRB also has a granted transaction mode (GTM) field which stores a value representing the upper bound of the lock modes granted to the transaction. Whenever a lock is granted or released, the GTM of the transaction is recomputed.

16 Claims, 3 Drawing Sheets

METHOD AND SYSTEM OF LOCK REQUEST MANAGEMENT IN A DATA PROCESSING SYSTEM HAVING MULTIPLE PROCESSES PER TRANSACTION

This application is a continuation of application Ser. No. 08/384,503, filed on Feb. 6, 1995, which was abandoned upon the filing hereof.

TECHNICAL FIELD OF THE INVENTION

This invention pertains in general to data processing systems and in particular to parallel database systems and more particularly to systems in which resources can be locked by transactions having multiple processes.

BACKGROUND OF THE INVENTION

In parallel databases and other systems that require frequent resource sharing, program elements can "lock" a specific resource. Lock modes include "shared" and "exclusive." A shared lock enables other elements to read the locked resource and is typically used when a program element wishes to read, but not alter, a resource. In contrast, an exclusive lock does not let any other element read the resource and is typically used when a program element wishes to write to a resource. Locks exist for a specified duration which is set by the program element.

The program element that requests a lock and processes the locked resource is called a "transaction." Transactions are comprised of one or more "processes." Each process, in turn, can request a lock. Thus, it is possible for a single transaction to have multiple locks and lock requests for different, or the same, resources.

Traditionally, lock requests were handled by a lock manager on a per transaction basis. When a transaction issued multiple lock requests with different lock modes and durations on the same lockable resource, the upper bound of the request modes and durations were maintained by the lock manager until all locks were released. This traditional method worked well if only one process was active in a transaction, but became less effective when multiple processes were active.

For example, suppose a process A requested a long duration shared lock while a process B, acting for the same transaction, requested a medium duration exclusive lock for the same resource. Under the traditional method, a single lock was created for the transaction. When process B finished its work and requested that the lock be released, the lock still was maintained because of process A's lock. Thus, the traditional method decreased concurrency and performance from optimal levels.

Moreover, the traditional method also increased the probability of deadlock. Deadlock is an impasse that occurs when multiple transactions are waiting for the availability of resources that will not become available because they are being held by other transactions in similar wait states. The longer a lock is held by a transaction, the greater the probability that deadlock will occur.

In addition, it is sometimes necessary for one process to release a lock held by another process. The traditional method, which only handles locks on the transaction level, lacks a way to perform such a release.

SUMMARY OF THE INVENTION

Therefore, it is an object of the present invention to provide a system and method for managing multiple lock requests which releases locked resources as soon as possible.

It is a further object of the present invention to provide a system and method for managing multiple lock requests which maintains an optimum level of concurrency.

It is a further object of the present invention to provide a system and method for managing lock requests which decreases the probability of deadlock from that of prior art systems and methods.

It is a further object of the present invention to provide a system and method for allowing one process to release a lock granted to another process.

The above and other objects are achieved by a system and method which manages lock requests at both the transaction and process levels. The present invention allocates one lock request block (LRB) per process and identifies the ownership of the lock by storing process, transaction and shared IDs in the LRB. The process ID is used to identify which lock to release when a process wants to release the lock before transaction commit while the transaction ID is used to identify all locks to be released at the commit/roll back time of the transaction. The shared ID is a unique value which identifies the lock. The LRB also has a granted transaction mode (GTM) field which stores a value representing the upper bound of the lock modes granted to the transaction. Whenever a lock is granted or released, the GTM for the transaction is recomputed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
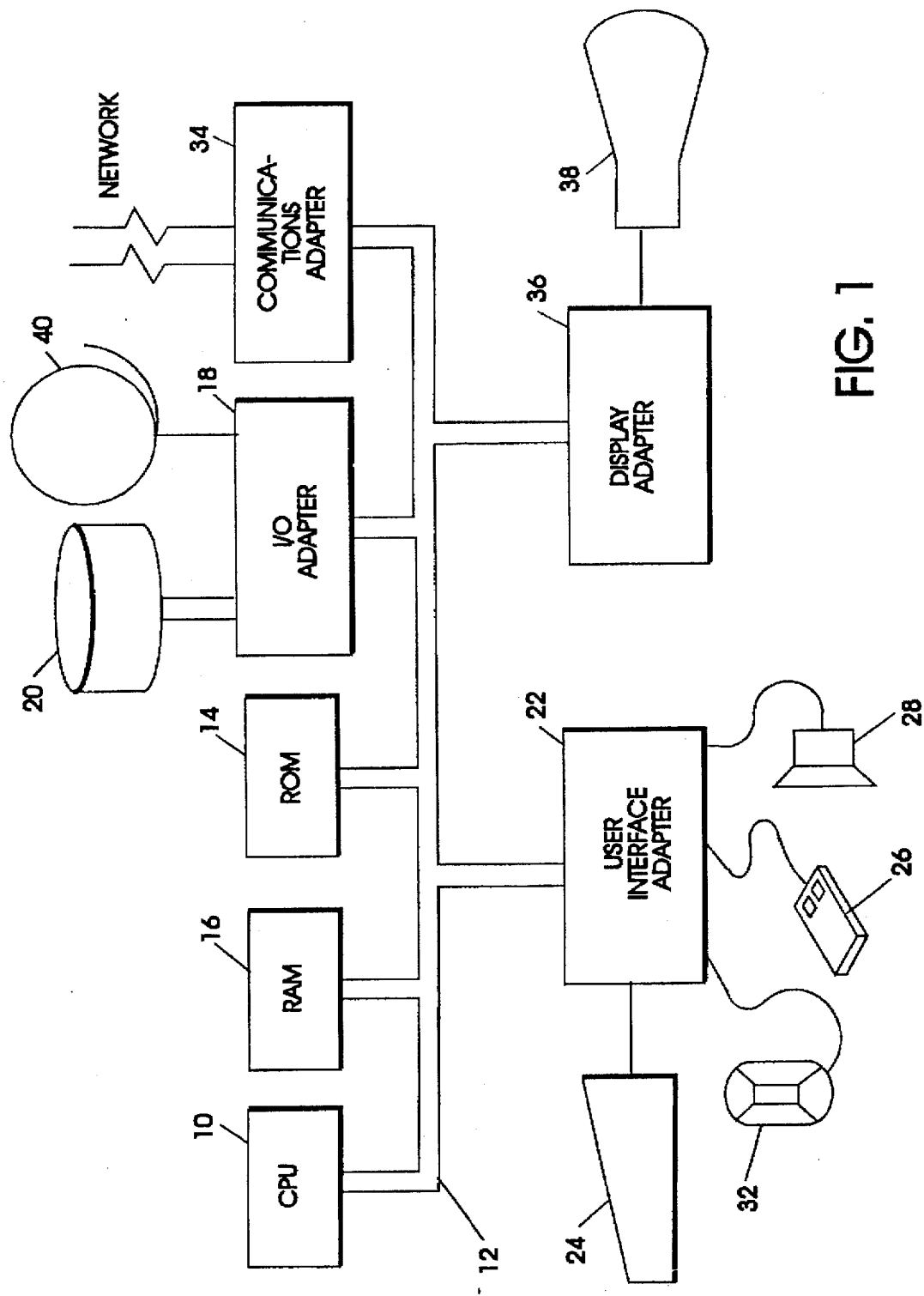
FIG. 1 shows a data processing system adapted for execution of a preferred embodiment of the present invention.

A hardware system for practicing the present invention is depicted in FIG. 1, which illustrates a typical hardware configuration of a workstation in accordance with the subject invention having at least one processing unit 10, such as a conventional microprocessor, and a number of other units interconnected via system bus 12. The workstation shown in FIG. 1 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

A data processing program that supports multiple processes per transaction, such as IBM's DB2/6000 Parallel Edition, is stored in RAM 14 and executed by processor 10. For a general understanding of such data processing programs, the reader is advised to consult Jim Gray & Andreas Reuter, *Transaction Processing: Concepts and Techniques*, Morgan-Kaufmann, 1993, which is hereby incorporated by reference. Lockable resources, such as data fields, are stored in RAM 14, disk units 20 and tape drives 40. Each lockable resource has a granted group mode (GGM) data field stored with the resource. The GGM indicates the lock status of the resource.

A single transaction can have multiple processes. Each process can request a resource lock. Possible lock modes include, but are not limited to, shared and exclusive. After a transaction is granted an exclusive lock request and then makes a change to the locked resource, the transaction can either commit or roll back the changes. Committing means making the changes permanent while rolling back means restoring the resource to its pre-lock state.

Processes send lock requests to a lock manager. The lock manager maintains a separate queue of lock requests for each lockable resource. When the lock manager receives a lock request, it allocates a lock request block (LRB) for the request and stores it in the queue associated with the requested resource. The lock manager places LRBs in the queues so as to group together all LRBs received from the same transaction. If no other LRBs from the same transaction are already in the queue, the lock manager appends the LRBs to the end of the queue.

The LRB contains data storage fields identifying the resource, mode, duration and status (granted or waiting) of the requested lock. The LRB also contains fields for storing a process ID, a transaction ID, a shared ID and a granted transaction mode (GTM). The process ID is used to identify which lock to release when a process wants to release a lock before transaction commit/roll back. The transaction ID field is used to identify all locks to be released at commit/roll back. The shared ID field contains a unique value identifying the lock. If the data processing program is IBM DB2/6000 Parallel Edition and the resource is locked for an opened cursor, then the address of the cursor control block can be used as the shared ID. The GTM field stores the upper bound of the lock mode granted to the transaction owning the LRB. The lock manager fills in the above fields, except for the GTM field, at the time the LRB is created.

Figure 2:
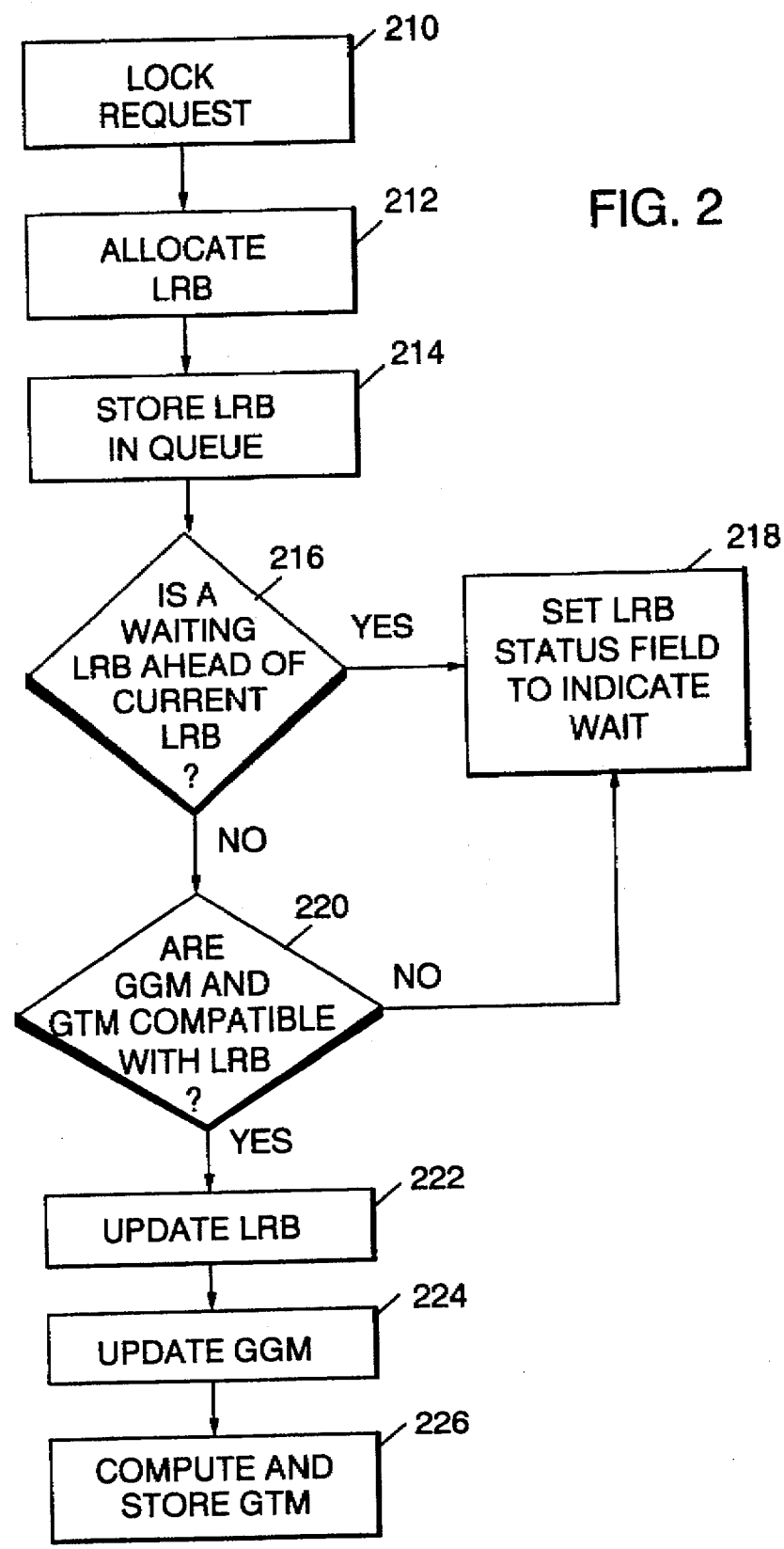
FIG. 2 is a flow chart showing the sequence of steps involved in locking a resource in accordance with the present invention.

FIG. 2 is a flow chart showing the sequence of steps involved in locking a resource. At step 210, a process sends a lock request (the "current lock request") to the lock manager. At step 212, the lock manager allocates a LRB (the "current LRB") and, at step 214, stores it in the queue associated with the requested resource. If the current lock request is the first request of the transaction, the current LRB is appended to the tail of the queue. Otherwise, the LRB is inserted into the queue at a position immediately following the other LRBs of the same transaction.

At step 216, the lock manager checks to see whether there are any LRBs in a wait state in the queue which are ahead of the current LRB. If so, the lock manager sets the status field of the LRB to indicate that it is waiting for the resource (step 218).

If there are no waiting LRBs in the queue ahead of the current LRB, the lock manager compares the GGM of the requested resource with the requested lock mode in the LRB to see whether the resource is available. A resource is available if it is not locked or is locked in a compatible mode, e.g., both the existing lock and the requested lock are for shared mode. For a complete understanding of how compatibility is determined, the reader is advised to consult the compatibility matrix on page 408 of the Gray and Reuter reference, cited above.

If other LRBs of the same transaction already have a lock on the resource, the lock manager also compares the requested lock mode with the transaction's GTM to determine compatibility. The requested lock mode is compatible with the GTM if the requested lock mode is less than or equal to the GTM. If the requested lock mode is compatible with the GGM or the transaction GTM, if it exists, the lock manager updates the status field of the LRB to indicate that the lock was granted (step 222).

At step 224, the lock manager updates the GGM of the locked resource. Of course, it is possible that the GGM would not need to be updated. For example, no update is necessary if the resource is already locked in shared mode when a shared lock is granted. At step 226, if the current LRB is the only LRB from its transaction, the lock manager computes a GTM reflecting the type of lock that was granted and stores it in the current LRB. If there are multiple LRBs belonging to the same transaction as the current LRB, the lock manager stores the upper bound of all of the processes' lock requests in the first LRB of that transaction in the queue. After these steps are completed, the lock manager can process the next lock request, if it exists.

A lock can be released by any process. The process that was originally granted the lock can release it by sending a release request containing that process' process ID to the lock manager. A different process can release the lock by sending a release request containing the lock's shared ID to the lock manager. When a transaction commits or rolls back, the lock manager uses the transaction ID to release all locks belonging to the transaction. After the lock is released, the lock manager will process the lock request queue to see if any waiting requests can be granted.

Figure 3:
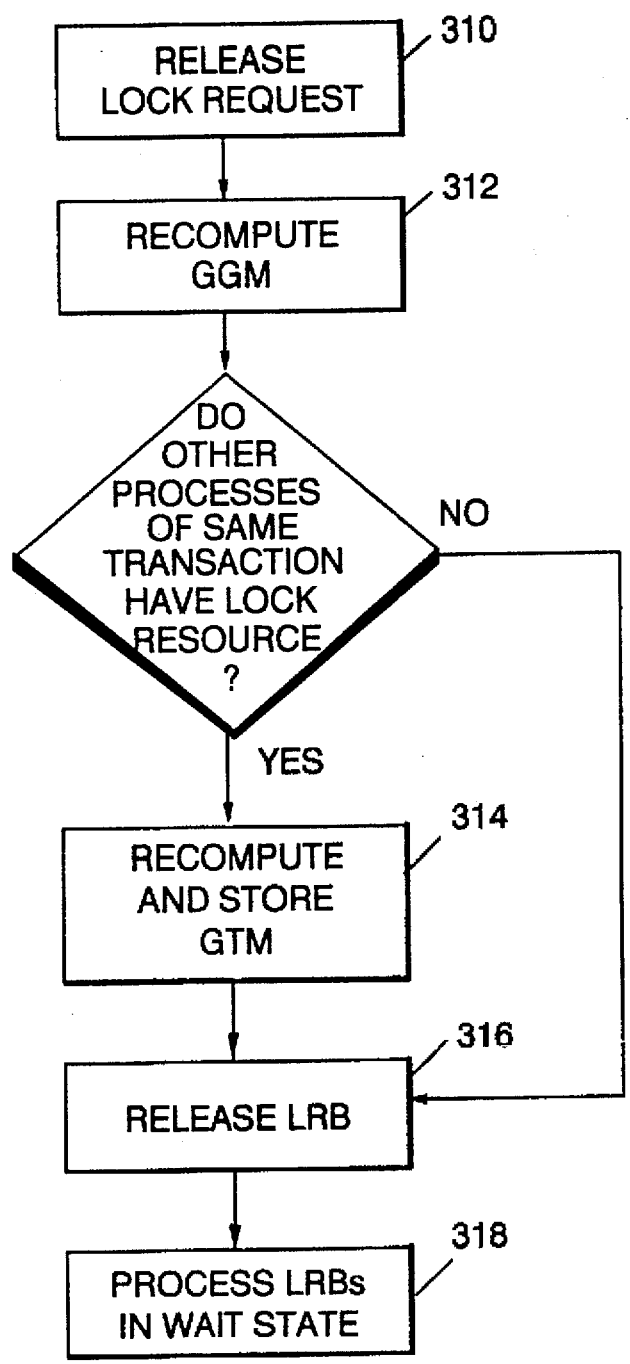
FIG. 3 is a flow chart showing the sequence of steps involved in releasing a locked resource in accordance with the present invention.

FIG. 3 is a flow chart showing the sequence of steps involved in releasing a locked resource. At step 310, the lock manager receives a request to release a lock. At step 312, the lock manager recomputes and stores the resource's GGM. If, after the lock is released, other processes from the same transaction will still own a lock on the resource, the lock manager recomputes and stores the GTM for that transaction (step 314). Then, at step 316, the lock manager frees the memory holding the LRB. At step 318, the lock manager processes that resource's LRB queue. The lock manager scans the queue for the first waiting LRB, if it exists. The lock manager processes this LRB and then continues through the queue until it finds a LRB that is not compatible with the GGM and GTM, or until it reaches the end of the queue. The processing of a waiting LRB is identical to steps 216–224 in FIG. 2.

Although the present invention and its advantages have been described in detail, it should be understood that various changes, substitutions and alterations can be made herein without departing from the spirit and scope of the invention as defined by the appended claims.

What is claimed is:

1. A method, of managing a request for a lock to a resource in a data processing system which processes a plurality of transactions having a plurality of processes per transaction wherein each process generates a lock request, comprising the steps of:

creating a lock request block for each process;

storing mode data in each lock request block to indicate the mode of the requested lock;

calculating, in a processor, a granted transaction mode for each lock request block;

storing, in a memory, the granted transaction mode in each lock request block;

performing the following steps when a second process of a transaction generates a lock request for a lock to a resource granted to a first process of said transaction:

comparing the granted transaction mode with the mode data in the lock request block corresponding to the second process to determine if the lock request is compatible with the granted transaction mode; and granting, by the first process, the lock to the second process if the granted transaction mode is compatible with the lock request; and recalculating, in the processor, the granted transaction mode each time the lock is granted to a process of said transaction to prevent said transaction from deadlocking.

2. The method of claim 1, wherein said calculating step comprises the step of computing an upper bound of lock requests granted to said transaction.

3. The method of claim 1, further comprising the step of grouping each lock request block in a queue associated with the lockable resource.

4. The method of claim 1, further comprising the steps of:

determining a process ID for said lock request from said process; and storing said process ID in said lock request block.

5. The method of claim 1, further comprising the steps of:

determining a transaction ID for said lock request from said transaction; and storing said transaction ID in said lock request block.

6. The method of claim 1, further comprising the steps of:

determining a shared ID for said lock request; and storing said shared ID in said lock request block.

7. The method of claim 1, further comprising the step of checking an existing granted transaction mode to determine compatibility with said lock request.

8. The method of claim 1, further comprising the steps of:

calculating a granted group mode associated with a lockable resource when said lock request block is granted; and calculating said granted group mode when said lock request block is released.

9. A data processing system for managing a request for a lock to a resource, comprising:

a processing unit for processing a plurality of transactions having a plurality of processes per transaction wherein each process generates a lock request;

a database system processed by said processing unit;

a lock manager associated with said data base system for creating a lock request block for each said process;

calculating means associated with said database system for calculating a granted transaction mode for said lock request block;

storing means associated with said database system for storing said granted transaction mode and mode data for indicating the mode of the requested lock in said lock request block;

wherein said lock manager compares, when a second process of a transaction generates a lock request for a lock to a resource granted to a first process of said transaction, said granted transaction mode with said mode data in said lock request block corresponding to said second process to determine if said lock request is compatible with said granted transaction mode and wherein said lock is granted, by said first process, to said second process if said granted transaction mode is compatible with said lock request; and wherein said calculating means includes means for recalculating said granted transaction mode each time said lock is granted to a process of said transaction to prevent said transaction from deadlocking.

10. The data processing system of claim 9, wherein said calculating means calculates an upper bound of said lock requests received from said process.

11. The data process system of claim 9, further comprising:

a queue for storing said lock request blocks, said queue associated with a lockable resource.

12. The data processing system of claim 9, further comprising:

a process ID associated with said process; and process ID storing means for storing said process ID in said lock request block.

13. The data processing system of claim 9, further comprising:

a transaction ID associated with said transaction; and transaction ID storing means for storing said transaction ID in said lock request block.

14. The data processing system of claim 9, further comprising:

a shared ID associated with said lock request; and shared ID storing means for storing said shared ID in said lock request block.

15. The data processing system of claim 9, further comprising:

an existing granted transaction mode;

checking means for checking said existing granted transaction mode for compatibility with one of said lock requests.

16. The data processing system of claim 9, further comprising:

a lockable resource;

a granted group mode associated with said lockable resource; and granted group mode calculating means for calculating said granted group mode when said lock request block is granted and when said lock request block is released.

* * * * *